US010779188B2

(12) United States Patent
Dsouza et al.

(10) Patent No.: US 10,779,188 B2
(45) Date of Patent: Sep. 15, 2020

(54) UPLINK BANDWIDTH ESTIMATION OVER BROADBAND CELLULAR NETWORKS

(71) Applicant: Cisco Technology, Inc., San Jose, CA (US)

(72) Inventors: Keith Neil Mark Dsouza, Pacifica, CA (US); Shivaji Pundlik Diwane, Pleasanton, CA (US); Madhusudana Rao Kata, Pleasonton, CA (US); Sendilvadivu Ganesan, Milpitas, CA (US); Divya Sudhakaran Pillai, Newark, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/123,830

(22) Filed: Sep. 6, 2018

(65) Prior Publication Data

US 2020/0084658 A1    Mar. 12, 2020

(51) Int. Cl.
*H04L 12/00* (2006.01)
*H04W 28/02* (2009.01)
(Continued)

(52) U.S. Cl.
CPC ..... *H04W 28/0278* (2013.01); *H04L 43/0888* (2013.01); *H04L 43/0894* (2013.01);
(Continued)

(58) Field of Classification Search
None
See application file for complete search history.

(56) References Cited

U.S. PATENT DOCUMENTS 4,236,068 A    11/1980 Walton
5,642,303 A    6/1997 Small et al.
(Continued)

FOREIGN PATENT DOCUMENTS

EP          2826165 B1    7/2017
WO    WO 2013/020126    2/2013
(Continued)

OTHER PUBLICATIONS

Shwetha et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
(Continued)

*Primary Examiner* — Noel R Beharry
*Assistant Examiner* — Lionel Preval
(74) *Attorney, Agent, or Firm* — Polsinelli PC

(57) ABSTRACT

Disclosed are methods, systems and non-transitory computer readable mediums for estimating bandwidth over packet data networks, for example, 5G networks. The methods, systems and non-transitory computer readable mediums can include modifying a buffer status report (e.g., via application programming interface) and reporting, to an eNodeB, the modified buffer status report. The methods, systems and non-transitory computer readable mediums can also include calculating the required throughput to satisfying transmitting a data amount stored at a regular buffer, receiving, from the eNodeB, uplink grants and transmitting, data from the regular buffer. The methods, systems and non-transitory computer readable mediums can also include calculating estimated throughput from the user equipment, determining if the estimated throughput services the data amount stored at the regular buffer and in response to the estimated throughput being insufficient to service the data amount stored the regular buffer, determining if a counter is less than a threshold value.

20 Claims, 5 Drawing Sheets

(51) Int. Cl.
*H04L 12/26* (2006.01)
*H04W 28/18* (2009.01)
*H04W 72/12* (2009.01)
*H04W 84/04* (2009.01)

(52) U.S. Cl.
CPC ....... *H04W 28/18* (2013.01); *H04W 72/1284* (2013.01); *H04W 84/045* (2013.01)

(56) References Cited

U.S. PATENT DOCUMENTS

| | | | |
|---|---|---|---|
| 5,751,223 | A | 5/1998 | Turner |
| 6,812,824 | B1 | 11/2004 | Goldinger et al. |
| D552,603 | S | 10/2007 | Tierney |
| 7,573,862 | B2 | 8/2009 | Chambers et al. |
| D637,569 | S | 5/2011 | Desai et al. |
| 7,975,262 | B2 | 7/2011 | Cozmei |
| 8,010,079 | B2 | 8/2011 | Mia et al. |
| 8,102,814 | B2 | 1/2012 | Rahman et al. |
| 8,260,320 | B2 | 9/2012 | Herz |
| 8,284,748 | B2 | 10/2012 | Borghei |
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,457,145 | B2 | 6/2013 | Zimmerman et al. |
| 8,458,184 | B2 | 6/2013 | Dorogusker et al. |
| D691,636 | S | 10/2013 | Bunton |
| 8,549,638 | B2 | 10/2013 | Aziz |
| 8,553,634 | B2 | 10/2013 | Chun et al. |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,761,174 | B2 | 6/2014 | Jing et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,060,352 | B2 | 6/2015 | Chan et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| 9,270,709 | B2 | 2/2016 | Shatzkamer et al. |
| 9,271,216 | B2 | 2/2016 | Friman et al. |
| 9,281,955 | B2 | 3/2016 | Moreno et al. |
| D757,424 | S | 5/2016 | Phillips et al. |
| D759,639 | S | 6/2016 | Moon et al. |
| 9,369,387 | B2 | 6/2016 | Filsfils et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| 9,467,918 | B1 | 10/2016 | Kwan |
| D776,634 | S | 1/2017 | Lee et al. |
| 9,544,337 | B2 | 1/2017 | Eswara et al. |
| 9,569,771 | B2 | 2/2017 | Lesavich et al. |
| 9,609,504 | B2 | 3/2017 | Karlqvist et al. |
| 9,615,268 | B2 | 4/2017 | Navarro et al. |
| 9,634,952 | B2 | 4/2017 | Gopinathan et al. |
| 9,642,167 | B1 | 5/2017 | Snyder et al. |
| 9,654,344 | B2 | 5/2017 | Chan et al. |
| 9,712,444 | B1 | 7/2017 | Bolshinsky et al. |
| 9,713,114 | B2 | 7/2017 | Yu |
| 9,736,056 | B2 | 8/2017 | Vasseur et al. |
| 9,762,683 | B2 | 9/2017 | Karampurwala et al. |
| 9,772,927 | B2 | 9/2017 | Gounares et al. |
| 9,820,105 | B2 | 11/2017 | Snyder et al. |
| D804,450 | S | 12/2017 | Spiel et al. |
| 9,858,559 | B2 | 1/2018 | Raleigh et al. |
| 9,860,151 | B2 | 1/2018 | Ganichev et al. |
| 9,933,224 | B2 | 2/2018 | Dumitriu et al. |
| 9,923,780 | B2 | 3/2018 | Rao et al. |
| 9,961,560 | B2 | 5/2018 | Farkas et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 9,998,368 | B2 | 6/2018 | Chen et al. |
| 2003/0087645 | A1 | 5/2003 | Kim et al. |
| 2003/0116634 | A1 | 6/2003 | Tanaka |
| 2004/0203572 | A1 | 10/2004 | Aerrabotu et al. |
| 2005/0090225 | A1 | 4/2005 | Muehleisen et al. |
| 2005/0169193 | A1 | 8/2005 | Black et al. |
| 2005/0186904 | A1 | 8/2005 | Kowalski et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0187866 | A1 | 8/2006 | Werb et al. |
| 2007/0037605 | A1 | 2/2007 | Logan |
| 2007/0239854 | A1 | 10/2007 | Janakiraman et al. |
| 2008/0037715 | A1 | 2/2008 | Prozeniuk et al. |
| 2008/0084888 | A1 | 4/2008 | Yadav et al. |
| 2008/0101381 | A1 | 5/2008 | Sun et al. |
| 2008/0163207 | A1 | 7/2008 | Reumann et al. |
| 2008/0233969 | A1 | 9/2008 | Mergen |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0228779 | A1 | 9/2011 | Goergen |
| 2011/0296064 | A1 | 12/2011 | Ehsan et al. |
| 2012/0023552 | A1 | 1/2012 | Brown et al. |
| 2012/0054367 | A1 | 3/2012 | Ramakrishnan et al. |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0167207 | A1 | 6/2012 | Beckley et al. |
| 2012/0182147 | A1 | 7/2012 | Forster |
| 2012/0311127 | A1 | 12/2012 | Kandula et al. |
| 2012/0324035 | A1 | 12/2012 | Cantu et al. |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0145008 | A1 | 6/2013 | Kannan et al. |
| 2013/0155906 | A1 | 6/2013 | Nachum et al. |
| 2013/0191567 | A1 | 7/2013 | Rofougaran et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |
| 2014/0007089 | A1 | 1/2014 | Bosch et al. |
| 2014/0016926 | A1 | 1/2014 | Soto et al. |
| 2014/0025770 | A1 | 1/2014 | Warfield et al. |
| 2014/0031031 | A1 | 1/2014 | Gauvreau et al. |
| 2014/0052508 | A1 | 2/2014 | Pandey et al. |
| 2014/0059655 | A1 | 2/2014 | Beckley et al. |
| 2014/0087693 | A1 | 3/2014 | Walby et al. |
| 2014/0105213 | A1 | 4/2014 | A K et al. |
| 2014/0118113 | A1 | 5/2014 | Kaushik et al. |
| 2014/0148196 | A1 | 5/2014 | Bassan-Eskenazi et al. |
| 2014/0179352 | A1 | 6/2014 | V.M. et al. |
| 2014/0191868 | A1 | 7/2014 | Ortiz et al. |
| 2014/0198808 | A1 | 7/2014 | Zhou |
| 2014/0222997 | A1 | 8/2014 | Mermoud et al. |

(56) References Cited

U.S. PATENT DOCUMENTS

| | | |
|---|---|---|
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0273083 A1 | 9/2017 | Chen et al. |
| 2017/0317997 A1 | 11/2017 | Smith et al. |
| 2017/0332333 A1 | 11/2017 | Santhanam et al. |
| 2017/0332421 A1 | 11/2017 | Sternberg et al. |
| 2017/0339706 A1 | 11/2017 | Andreoli-Fang et al. |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0124764 A1* | 5/2018 | Lee ............... H04W 72/0486 |
| 2018/0131490 A1* | 5/2018 | Patel .............. H04L 5/0051 |
| 2018/0199343 A1* | 7/2018 | Deogun .......... H04W 72/0453 |
| 2018/0302868 A1* | 10/2018 | Bhorkar .......... H04W 56/0005 |

FOREIGN PATENT DOCUMENTS

| | | |
|---|---|---|
| WO | WO 2014/098556 | 6/2014 |
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

"Cisco ASR 5x00 Mobility Management Entity Administration Guide," Version 15.0, Cisco Systems, Inc., Last updated Jun. 13, 2014, pp. 1-266.

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials For Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to The University of Liverpool, Sep. 28, 2005, 116 pages.

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al., "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2_Roaum_Roaming_IoT_Whitepaper.pdf, pp. 1-14.

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways To De-Congest Data Center Networks," Microsoft Research, Oct. 23, 2009, 6 pages.

(56) References Cited

OTHER PUBLICATIONS

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, Ulf, "Supporting Location-Awareness in Open Distributed Systems," May 1998, 186 pages.

Morozov, Yury, "Blockchain Telecom: Bubbletone Blockchain," Dec. 29, 2017, pp. 1-33.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Sun, et al., "The future of Wi-Fi," IEEE Communications Magazine, vol. 52, No. 11, Nov. 21, 2014, 166 pages.

Ventre, Pier Luigi, et al., "Performance Evaluation and Tuning of Virtual Infrastructure Managers for (Micro) Virtual Network Functions,"ieee.org, Nov. 7-10, 2016, pp. 1-7.

Wright, Joshua, "Detecting Wireless LAN MAC Address Spoofing," Jan. 21, 2003, pp. 1-20.

Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

International Search Report and Written Opinion from the International Searching Authority, dated Nov. 6, 2019, 14 pages, for corresponding International Patent Application No. PCT/US2019/048827.

\* cited by examiner

UPLINK BANDWIDTH ESTIMATION OVER BROADBAND CELLULAR NETWORKS

TECHNICAL FIELD

The present technology pertains to packet data networks, and more specifically to estimating uplink bandwidth for user equipment over 5G networks.

BACKGROUND

Fifth generation (5G) mobile and wireless networks will provide enhanced mobile broadband communications and are intended to deliver a wider range of services and applications as compared to prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks extend the network slicing concept utilized in previous generation architectures.

Within the scope of the 5G mobile and wireless network architecture, resources are shared between a number of subscribers (e.g., UE). As a results, overall bandwidth available to subscribers is shared based on one or more parameters (e.g., channel conditions, network congestion, signal to noise ratio, resource availability at the evolved node B (eNodeB)). As a result, even though the theoretical maximum throughput that the UE can support is known, it is difficult to estimate or predict the amount of throughput any specific UE can actually achieve over the network. As a result, upper layer protocols (e.g., TCP/IP, UDP, etc.) cannot make accurate decisions for traffic over cellular interfaces (e.g., modem).

BRIEF DESCRIPTION OF THE DRAWINGS

In order to describe the manner in which the above recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
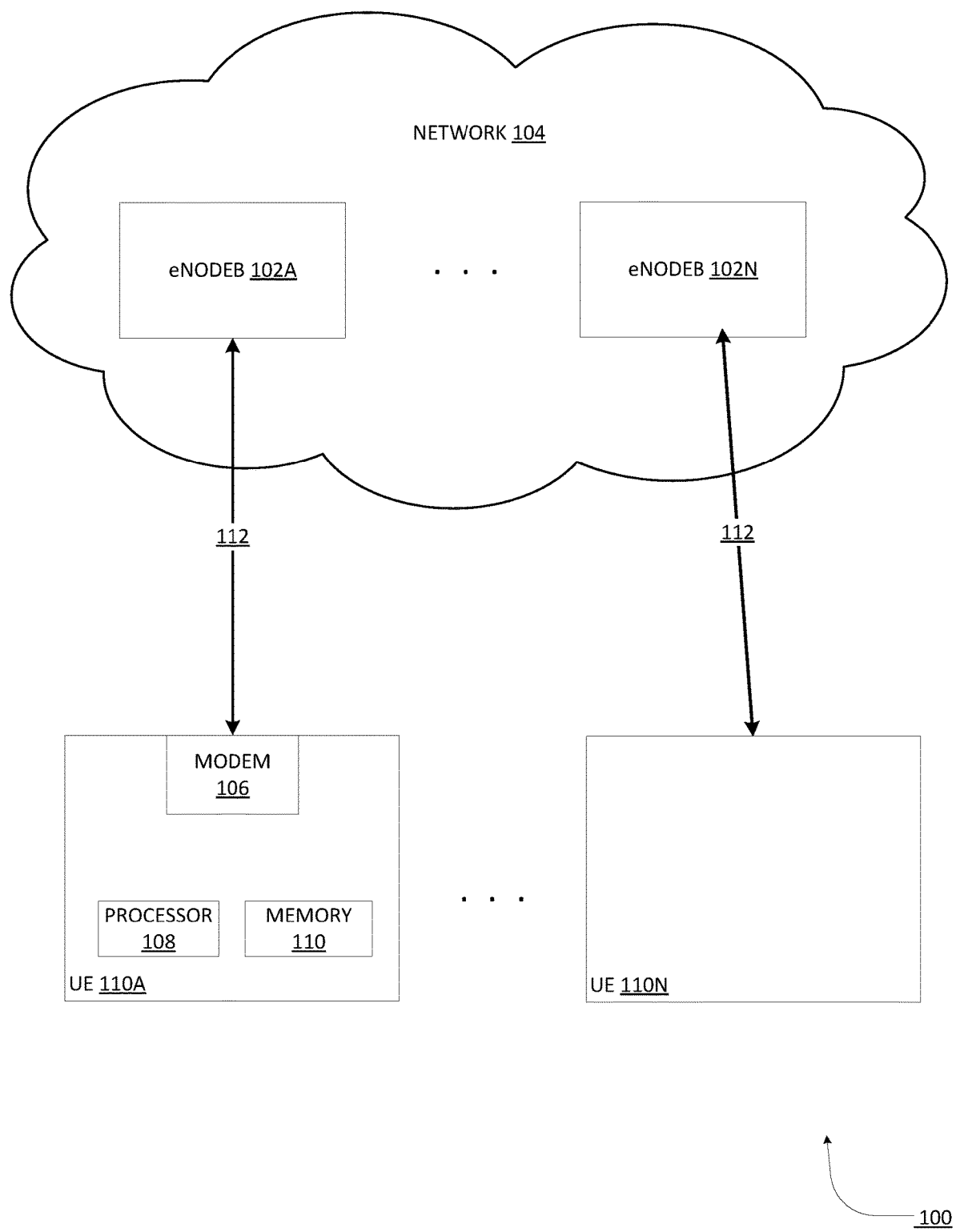
FIG. 1 illustrates an example 5G network environment in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting the scope of the embodiments described herein. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are methods, systems and non-transitory computer readable mediums for estimating bandwidth over packet data networks, for example, 5G networks. The methods, systems and non-transitory computer readable mediums can include modifying a buffer status report (e.g., via application programming interface) and reporting, to an eNodeB, the modified buffer status report. The methods, systems and non-transitory computer readable mediums can also include calculating the required throughput to satisfying transmitting a data amount stored at a regular buffer, receiving, from the eNodeB, uplink grants and transmitting, data from the regular buffer. The methods, systems and non-transitory computer readable mediums can also include calculating estimated throughput from the user equipment, determining if the estimated throughput services the data amount stored at the regular buffer and in response to the estimated throughput being insufficient to service the data amount stored the regular buffer, determining if a counter is less than a threshold value (e.g., 5, configured by a user, etc.). When the counter is less than the threshold value, recording the estimated throughput for the counter, incrementing the counter, reporting a padding amount, and padding a bandwidth estimation buffer with the padding amount.

The methods, systems and non-transitory computer readable mediums can also include modifying the buffer status report by determining an amount of data to be sent from a regular buffer, determining a padding amount from the bandwidth estimation buffer, combining the amount of data to be sent from the regular buffer and the padding amount and modifying the buffer status report with the combined amount.

The methods, systems and non-transitory computer readable mediums can also include in response to the estimated throughput being sufficient to service the data amount stored the regular buffer, determining maximum throughput calculated over one or more packet data networks from the user equipment and determining the padding amount by subtracting the estimated throughput from the maximum throughput.

The methods, systems and non-transitory computer readable mediums can also include when the counter is equal to or greater than the threshold value, calculating an average throughput over one or more estimated throughput values, reporting the average estimated throughput values and emptying the bandwidth estimation buffer. In some examples, the emptying comprises zeroing out the bandwidth estimation buffer.

Example Embodiments

Figure 2:
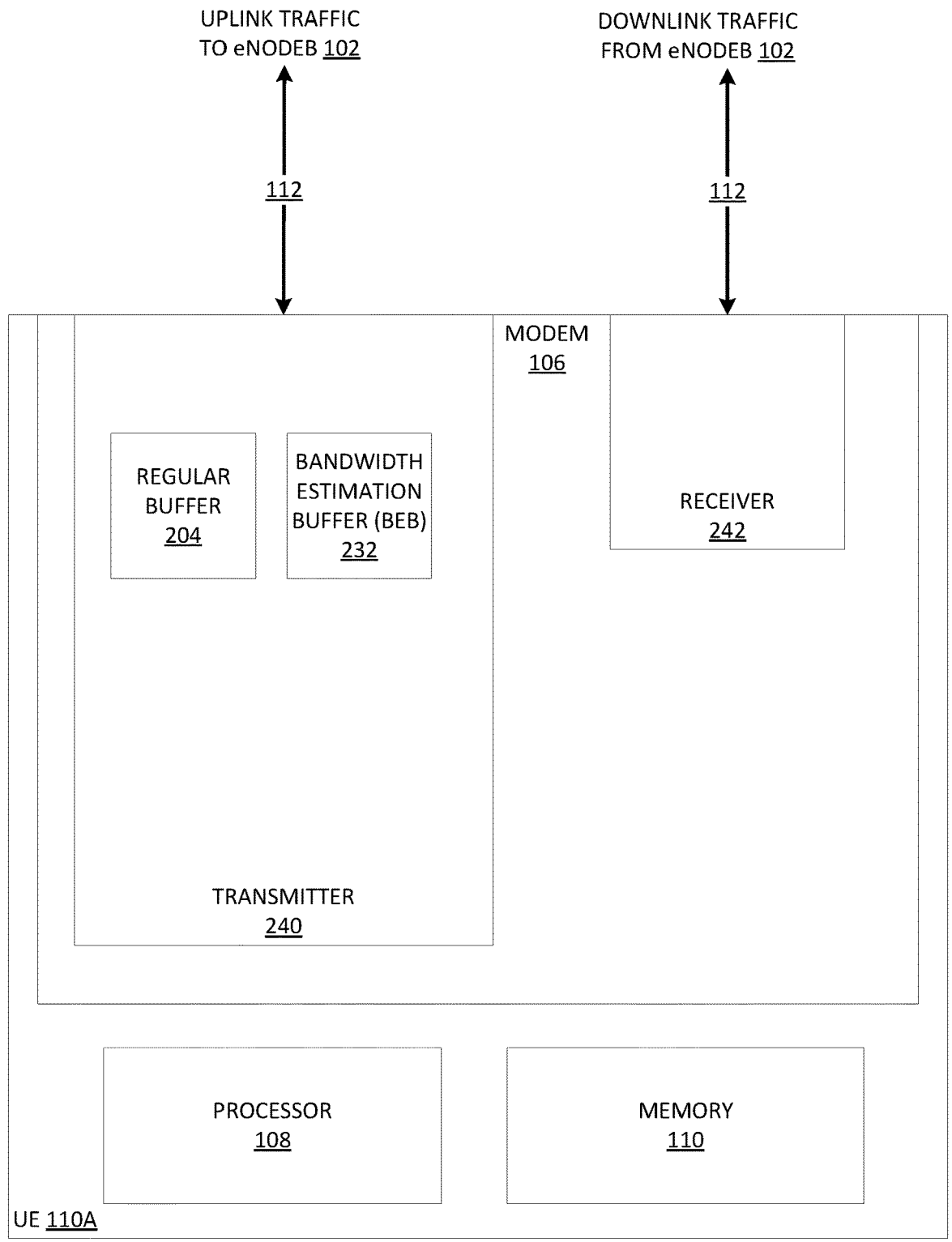
FIG. 2 illustrates an example block diagram of user equipment according to one or more aspects of the present disclosure.
Figure 3:
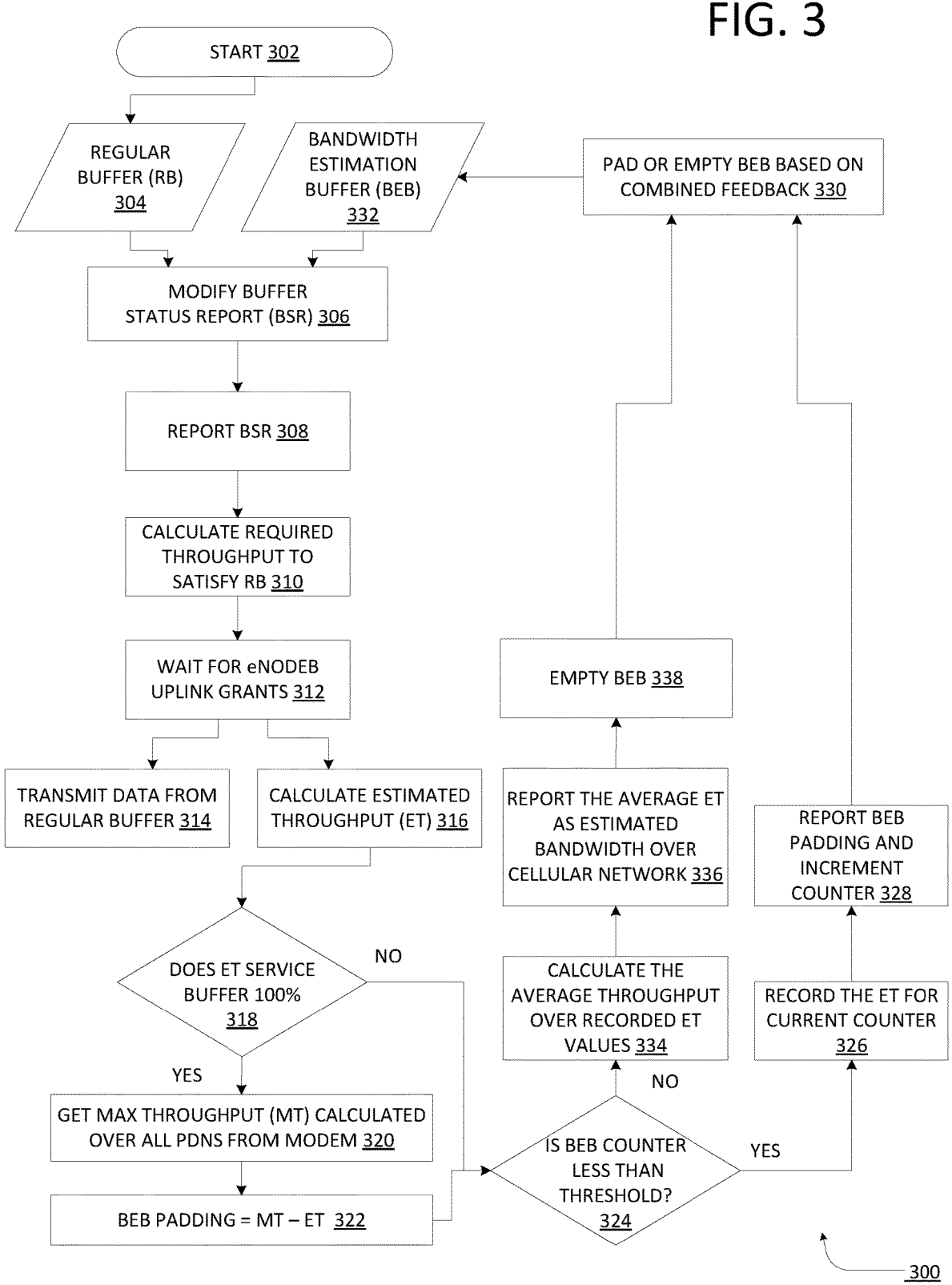
FIG. 3 illustrates an example method for estimating bandwidth according to one or more aspects of the present disclosure.
Figure 4:
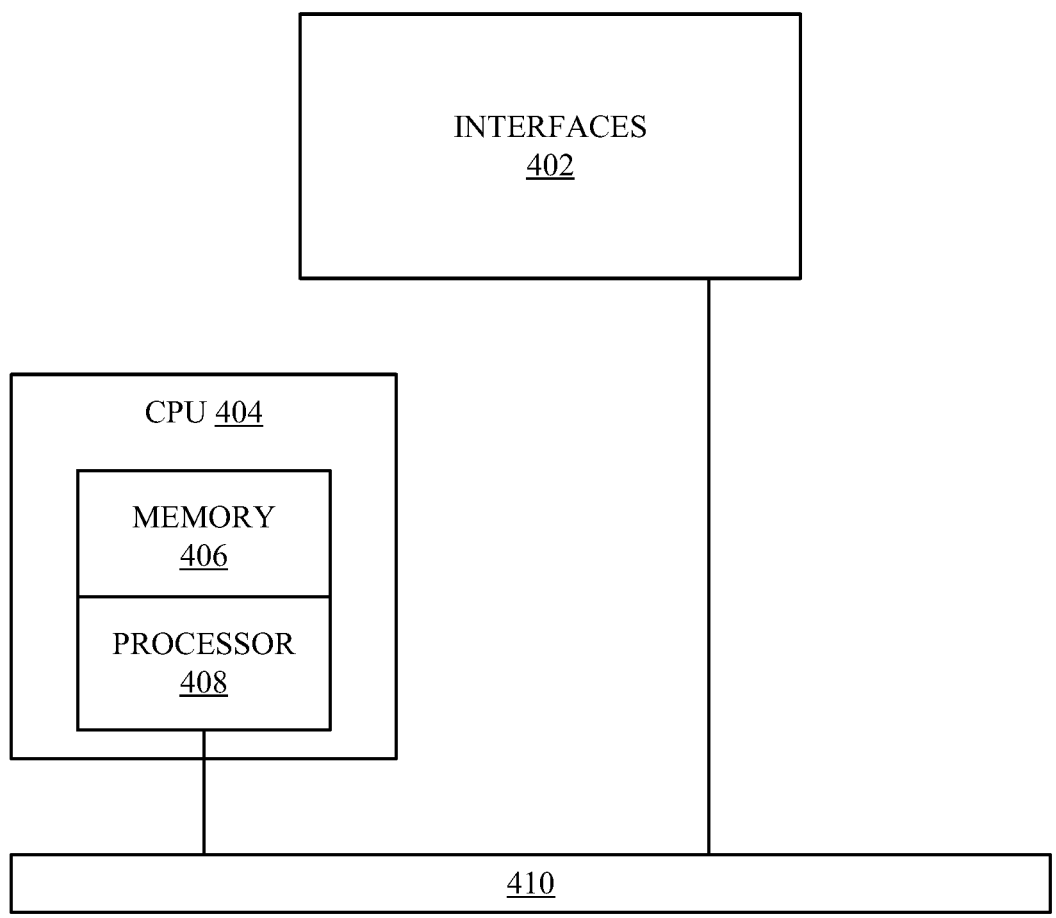
FIG. 4 illustrates an example network device upon which one or more aspects of the present disclosure may be provided.
Figure 5:
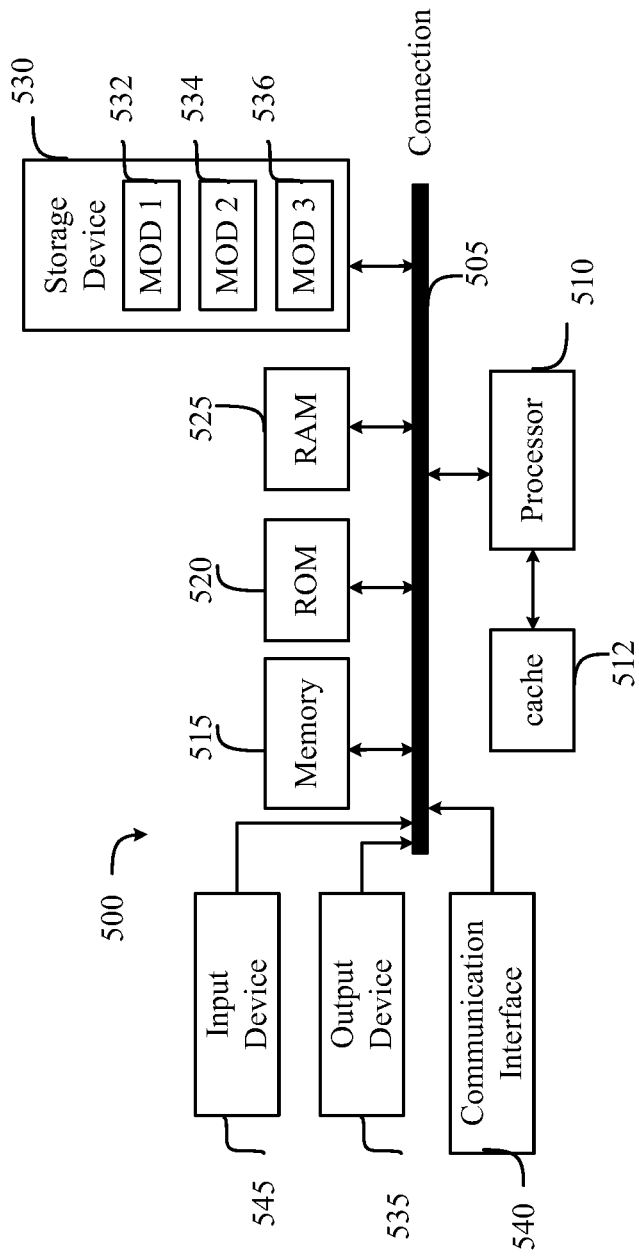
FIG. 5 illustrates an example computing system architecture upon which one or more aspects of the present disclosure may be provided.

The disclosed technology addresses the need in the art for estimating available bandwidth of user equipment in a 5G network. Disclosed are systems, methods, and computer-readable storage media for estimating available bandwidth by manipulating status reports of a regular buffer (RB) by utilizing a bandwidth estimate buffer (BEB) based on maximum and estimated throughput. A description of network computing environments and architectures, as illustrated in FIG. 1, is first disclosed herein. A discussion of user equipment as illustrated in FIG. 2. will then follow. A discussion of estimating the overall bandwidth as illustrated in FIG. 3 will then follow. The discussion then concludes with a description of example devices, as illustrated in FIGS. 4 and 5. These variations shall be described herein as the various embodiments are set forth. The disclosure now turns to FIG. 1.

FIG. 1 depicts an example representation of a network environment 100 in which one or more aspects of the present disclosure may operate. Network 104 can be a broadband cellular network, for example, 5G, 4G, LTE, etc. While not limiting, examples herein will discuss 5G networks. Network 104 can include one or more Evolved Node B (eNodeB) 102A, ... 102N (collectively "102"). eNodeB 102 can be network hardware connected to network 104 that communicates directly and wirelessly through packet data network 112 (PDN) with user equipment (UE) 110A, ... 110N (collectively "110"). For example, user equipment can include any component, element or object capable of transferring and receiving voice or data with eNodeB of the network. In some examples, user equipment can be a router, a switch, mobile telephone, etc. Data and/or information, as used herein, refers to any type of numeric, voice, video, media, or script data, or any type of source or object code, or any other suitable information in any appropriate format that may be communicated from one point to another. In some examples, eNodeB 102 can recognize a cellular interface (e.g., modem) of UE 110 initiating communication with network 104. UE 110 can transmit and/or receive data through modem 106 (e.g., I/O interface, cellular interface, etc.). UE 110 can also include processor 108 and memory 110 configured to store and execute instructions for the operation of UE 110 and for transmitting and/or receiving data through modem 106. Further details of UE 100 is shown in FIGS. 4 and 5.

FIG. 2 depicts an example representation of a user equipment 110 in which one or more aspects of the present disclosure may operate. Modem 106 of UE 110 can include transmitter 240 for sending data via PDN 112 to eNodeB 102 and receiver 242 for receiving data via PDN 112 from eNodeB 102. Transmitter 240 can transmit data as much as the uplink grants allocated by eNodeB 102. That is, eNodeB 102 can allocate uplinks grants of a specific amount of throughput that UE 102 can transmit at any given time. Transmitter 240 can also include RB 204 and BEB 232. RB 204 can store data to be transmitted to eNodeB 102. For example, modem 106 transmits, to eNodeB 102, a Buffer Status Report (BSR). The BSR can indicate the amount of data stored in RB 204 that needs to be transmitted to eNodeB 102. eNodeB 102 can then allocated UL grants to enable transmitter 240 to transmit the data stored in RB 204 to the eNodeB 102. In some situations, it is difficult for the UE to estimate how much throughput can be achieved. BEB 232, as shown in FIG. 3, can store padded data (e.g., data that will not be sent to an eNodeB), which can be used to alter the BSR, in order to determine the maximum throughput on any specific eNodeB.

The disclosure now turns to FIG. 3. The method shown in FIG. 3 is provided by way of example, as there are a variety of ways to carry out the method. Additionally, while the example method is illustrated with a particular order of blocks, those of ordinary skill in the art will appreciate that FIG. 3 and the blocks shown therein can be executed in any order that accomplishes the technical advantages of the present disclosure and can include fewer or more blocks than illustrated.

Each block shown in FIG. 3 represents one or more processes, methods or subroutines, carried out in the example method. The blocks shown in FIG. 3 can be implemented in a network environment such as network environment 100 shown in FIGS. 1 and 2. The flow chart illustrated in FIG. 3 will be described in relation to and make reference to at least the elements of network 100 shown in FIGS. 1 and 2.

Method 300 can begin at block 302. At block 302, an estimation of bandwidth can start (e.g., initiated). Upon initiation, and on first run through of method 300, a data amount in regular buffer (RB) 304 is determined. On the first run through of method 300, any data in BEB 332, if present, is considered stale and not used. At block 306, the buffer status report (BSR) is modified. The BSR can indicate how much data is stored in RB 304 that modem 106 has to send to eNodeB 102. On the first run though of method 300, the BSR is not modified. On subsequent run throughs, the BSR can be modified to reflect the amount of data is RB 304 and BEB 332. The BSR can be modified by, for example, one or more application programming interface (API). For example, the API can be utilized to modify the BSR to indicate RB 304 is "full" or "over capacity" (i.e., data waiting to be read into RB 304). By allocating RB 304 as full, eNodeB 102 can provide maximum available uplink grants for transmitting data in RB 304 (e.g., throughput). When the RB 304 is not full, eNodeB 102 can provide uplink grants (e.g., less uplink grants than when RB 304 is full) to send the data stored in RB 304.

At block 308, the BSR can be reported to eNodeB 102. In some examples, the eNodeB can receive a plurality of BSRs from a plurality of UEs. In providing uplink grants to each UE, the eNodeB can consider the received plurality of BSRs. At block 310, the UE can calculate the throughput required to satisfy the data in RB 304. At block 312, the eNodeB can provide, and modem 106 can wait for and receive, one or more uplink grants. At block 314, upon receiving the uplink grants, modem 106 can transmit, and the eNodeB 102 can receive the data stored in RB 304.

At block 316, estimated throughput (ET) can be calculated. ET can be calculated and based on the uplink grants provided from the eNodeB. In some example, the ET can be calculated from modulation scheme and number of physical resource blocks that are assigned (e.g., TS36.213). At block 318, a determination can be made as to whether the ET can service (e.g., sufficient to transmit) the data currently stored (and/or all of the data that could be stored) in RB 304. In situations where BEB padding exists, the determination can include the combination of data in RB 304 and the BEB padding stored in BEB 332. For example, if the UL grants of 50 Mbps are required to service data stored in RB 304, but the calculated ET is 30 Mbps, then the UE knows the most bandwidth the eNodeB can provide at this instance is less than the UE requires. This value is recorded (block 326). In other examples, if UL grants of 30 Mbps are required to service data stored in RB 304, but the calculated ET is 30 Mbps then the modem could request more bandwidth (i.e., since the eNodeB can potentially provide the UE more grants). This can be calculated into the BSR (e.g., BEB padding).

In some examples, when the traffic (e.g., data) being transmitted over the PDN is of high volume, the BEB will always be empty since the UL grants being received at the modem will be equal to or less than the total required by the modem to service the data requests in the RB. As such, averaging the received UL grants (block 334) will provide an estimation of the bandwidth, which can be provides to the UE and other upper layer protocols. When the traffic (e.g., data) being transmitted over the PDN is low, the UL grants will be enough to service 100% of the RB. The BEB can then aid in modifying the reported BSR to a higher value than data stored in the RB. The higher value to the BSR can provide an estimation of the possible throughput achievable over the uplink (e.g., the modem sends the data from the RB over the UL grants).

When the ET cannot service 100% of the RB, method 300 can proceed to block 324. When the ET can service 100% of the RB, method 300 can proceed to block 320.

At block 320, the maximum possible throughput (MT) is determined for the one or more PDNs from modem 106 to the eNodeB. For example, the MT can be determined based on the capabilities of the modem (e.g., type, CAT4, CAT5, etc.). At block 322, BEB padding is calculated by subtracting the ET from the MT.

At block 324, a determination is made as to whether the BEB counter is less than a threshold amount. The threshold amount can be a number of times that method 300 has been iterated. On the initial run of method 300, BEB counter can be 0. On subsequent runs, the BEB counter will increment. When the BEB counter reaches a threshold amount, the BEB can be emptied and the counter reset (as shown in block 338). While not limiting, in some examples, a threshold amount can be 5. In other examples, the threshold amount can be configurable by a user or automatically configured based on historical data, including historical iterations of method 300.

When the BEB counter is less than the threshold, method 300 can proceed to block 326. At block 326, the ET for the current BEB counter is recorded. In one example, the ET value can be in a local memory of the UE, along with the BEB counter value. For example, for BEB counter value 1, the ET could be 74.6 MBps; for BEB counter value 2, the ET could be 90.0 MBps; etc. At block 328, the BEB counter is incremented and the BEB padding is reported. At block 330, the BEB is either padded or emptied. When the BEB counter is less than the threshold, BEB 332 is padded and another iteration of method 300 is initiated.

Upon further iterations, the BEB padding (block 332) and the data in RB 304 can be used in combination to modify the BSR, at block 306, via the API. For example, the combination can be used to modify the BSR to indicate more data is stored in RB 304 than is actually present. This indication, of the combination of data (e.g., actual data and padding) waiting to be sent to an eNodeB, can notify modem 106 of the actual available bandwidth at that specific time (e.g., received UL grants based on the additional padded data and actual data). That is, the actual available bandwidth, at that specific time, can be the uplink grants from the eNodeB—which are based on the combination of the data in RB 304 and BEB padding in BEB 332. Method 300 can continue, as described above until at block 324, the BEB counter is equal to or greater than the threshold amount. When the BEB counter is equal to or greater than the threshold amount, method 300 can proceed to block 334.

At block 334, the average throughput over recorded ET values is calculated. For example, the ET values (e.g., stored at block 326) can be the average estimated bandwidth over the cellular network (e.g. PDN). In one example, the ET values (for each BEB counter value) can be averaged to calculate the average throughput. At block 336, the average throughput over recorded ET values (e.g. average ET) is reported (e.g., to UE 110 for use by the upper layer protocols). At block 338, the BEB is emptied and the BEB counter can be reset to zero. For example, the BEB can be zeroed out. Method 300 can then restart the estimation process. In some examples, the method can proceed at predetermined intervals, timers, user configured, on-demand, etc.

FIG. 4 depicts an example network device upon which one or more aspects of the present disclosure can be implemented. Although the system shown in FIG. 4 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC), which can be configured to perform routing, switching, and/or other operations. The ASIC can communicate with other components in the network device 400 via the connection 410, to exchange data and signals and coordinate various types of operations by the network device 400, such as routing, switching, and/or data storage operations, for example.

FIG. 5 illustrates an example computing system architecture 500 including components in electrical communication with each other using a connection 505, such as a bus, upon which one or more aspects of the present disclosure can be implemented. System 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for estimating throughput from user equipment to an eNodeB, the system comprising:
    at least one processor; and
    at least one memory storing instructions, which when executed by the at least one processor, causes the at least one processor to:
        modify a buffer status report to yield a modified buffer status report associated with a bandwidth estimation buffer;
        report, to one or more eNodeB, the modified buffer status report;
        calculate a required throughput to satisfying transmitting a data amount stored at a regular buffer;
        receive, from the one or more eNodeB, uplink grants;
        transmit data from the regular buffer;
        calculate estimated throughput from the user equipment;
        determine whether the estimated throughput is sufficient to service the data amount stored at the regular buffer;
        when the estimated throughput is insufficient to service the data amount, determine whether a counter value for a counter associated with the bandwidth estimation buffer is less than a threshold value; and
        when the counter value is less than the threshold value, record the estimated throughput, increment the counter, report a padding amount, and pad the bandwidth estimation buffer with the padding amount.

2. The system of claim 1, wherein the buffer status report is modified by an application programming interface.

3. The system of claim 1, wherein the at least one memory comprising further instructions, which when executed by the at least one processor, causes the at least one processor to:
    determine an amount of data to be sent from the regular buffer;
    determine the padding amount from the bandwidth estimation buffer;
    combine the amount of data to be sent from the regular buffer and the padding amount to yield a combined amount; and
    modify the buffer status report with the combined amount.

4. The system of claim 1, wherein the at least one memory comprising further instructions, which when executed by the at least one processor, causes the at least one processor to:
    when the estimated throughput is sufficient to service the data amount stored the regular buffer, determine maximum throughput calculated over one or more packet data networks from the user equipment, and determine the padding amount by subtracting the estimated throughput from the maximum throughput.

5. The system of claim 1, wherein the at least one memory comprising further instructions, which when executed by the at least one processor, causes the at least one processor to:
    when the counter is equal to or greater than the threshold value, calculate an average throughput over one or more estimated throughput values, report the average throughput, empty the bandwidth estimation buffer, and reset the bandwidth estimation buffer.

6. The system of claim 1, wherein emptying the bandwidth estimation buffer includes zeroing out the bandwidth estimation buffer.

7. The system of claim 1, wherein the threshold value is 5.

8. A method for estimating throughput from user equipment to an eNodeB, the method comprising:
    modifying a buffer status report to yield a modified buffer status report associated with a bandwidth estimation buffer;
    reporting, to one or more eNodeB, the modified buffer status report;
    calculating a required throughput to satisfying transmitting a data amount stored at a regular buffer;
    receiving, from the one or more eNodeB, uplink grants;
    transmitting, data from the regular buffer;
    calculating estimated throughput from the user equipment;
    determining whether the estimated throughput is sufficient to service the data amount stored at the regular buffer;
    when the estimated throughput is insufficient to service the data amount, determining whether a counter value for a counter associated with the bandwidth estimation buffer is less than a threshold value; and
    when the counter value is less than the threshold value, recording the estimated throughput, incrementing the counter, reporting a padding amount and padding the bandwidth estimation buffer with the padding amount.

9. The method of claim 8, wherein the buffer status report is modified by an application programming interface.

10. The method of claim 8, wherein the modifying of the buffer status report includes:
    determining an amount of data to be sent from the regular buffer;
    determining the padding amount from the bandwidth estimation buffer;
    combining the amount of data to be sent from the regular buffer and the padding amount to yield a combined amount; and
    modifying the buffer status report with the combined amount.

11. The method of claim 8, further comprising:
    when the estimated throughput is sufficient to service the data amount, determining maximum throughput calculated over one or more packet data networks from the user equipment, and determining the padding amount by subtracting the estimated throughput from the maximum throughput.

12. The method of claim 8, further comprising:
    when the counter is equal to or greater than the threshold value, calculating an average throughput over one or more estimated throughput values, reporting the average throughput, emptying the bandwidth estimation buffer, and resetting the bandwidth estimation buffer.

13. The method of claim 12, wherein the emptying of the bandwidth estimation buffer includes zeroing out the bandwidth estimation buffer.

14. The method of claim 8, wherein the threshold value is 5.

15. A non-transitory computer readable medium, for estimating throughput from user equipment to an eNodeB, storing instructions which when executed by at least one processor, cause the at least one processor to:

modify a buffer status report to yield a modified buffer status report associated with a bandwidth estimation buffer;

report, to one or more eNodeB, the modified buffer status report;

calculate a required throughput to satisfying transmitting a data amount stored at a regular buffer;

receive, from the one or more eNodeB, uplink grants;

transmit, data from the regular buffer;

calculate estimated throughput from the user equipment;

determine whether the estimated throughput is sufficient to service the data amount stored at the regular buffer;

when the estimated throughput is insufficient to service the data amount, determine whether a counter value for a counter associated with the bandwidth estimation buffer is less than a threshold value; and when the counter value is less than the threshold value, record the estimated throughput, increment the counter, report a padding amount, and pad the bandwidth estimation buffer with the padding amount.

16. The non-transitory computer readable medium of claim 15, wherein the buffer status report is modified by an application programming interface.

17. The non-transitory computer readable medium of claim 15, comprising further instructions, which when executed by the at least one processor, causes the at least one processor to:

determine an amount of data to be sent from the regular buffer;

determine the padding amount from the bandwidth estimation buffer;

combine the amount of data to be sent from the regular buffer and the padding amount to yield a combined amount; and modify the buffer status report with the combined amount.

18. The non-transitory computer readable medium of claim 15, comprising further instructions, which when executed by the at least one processor, causes the at least one processor to:

when the estimated throughput is sufficient to service the data amount, determine maximum throughput calculated over one or more packet data networks from the user equipment, and determine the padding amount by subtracting the estimated throughput from the maximum throughput.

19. The non-transitory computer readable medium of claim 15, comprising further instructions, which when executed by the at least one processor, causes the at least one processor to:

when the counter is equal to or greater than the threshold value, calculate an average throughput over one or more estimated throughput values, report the average throughput, empty the bandwidth estimation buffer, and reset the bandwidth estimation buffer.

20. The non-transitory computer readable medium of claim 19, wherein emptying the bandwidth estimation buffer includes zeroing out the bandwidth estimation buffer.

* * * * *